(12) United States Patent
Li et al.

(10) Patent No.: US 12,438,441 B2
(45) Date of Patent: Oct. 7, 2025

(54) METHOD AND APPARATUS FOR REDUCING AUDIBLE BUZZ FROM A SWITCHING-MODE POWER SUPPLY

(71) Applicant: Avago Technologies International Sales Pte. Limited, Singapore (SG)

(72) Inventors: Shengyuan Li, Irvine, CA (US); Xicheng Jiang, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 144 days.

(21) Appl. No.: 18/117,347

(22) Filed: Mar. 3, 2023

(65) Prior Publication Data
US 2024/0297573 A1  Sep. 5, 2024

(51) Int. Cl.
*H02M 1/14* (2006.01)
*H02M 3/04* (2006.01)

(52) U.S. Cl.
CPC ............... *H02M 1/14* (2013.01); *H02M 3/04* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/465; G05F 1/468; G05F 1/562; G05F 1/565; G05F 1/567; G05F 1/569; G05F 1/571; G05F 1/573; G05F 1/5735; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045;
(Continued)

(56) References Cited

U.S. PATENT DOCUMENTS

| 6,215,288 | B1 * | 4/2001 | Ramsey | H02M 3/1588 |
| | | | | 323/224 |
| 6,346,801 | B1 * | 2/2002 | Zafarana | H02M 3/157 |
| | | | | 323/224 |

(Continued)

FOREIGN PATENT DOCUMENTS

JP  H1175366  *  3/1999

OTHER PUBLICATIONS

English Translation of JP H1175366 (Year: 1999).*
European Search Report on non-Foley case related to US Dtd Jul. 16, 2024.

*Primary Examiner* — Sean Kayes
*Assistant Examiner* — Nusrat Quddus
(74) *Attorney, Agent, or Firm* — Foley & Lardner LLP

(57) ABSTRACT

An apparatus of the subject technology includes a circuit to switch a first current based on a switching frequency and generate an output voltage, and a first circuit coupled to the circuit to adjust the switching frequency through changing a frequency of the circuit to a value higher than a threshold.

18 Claims, 4 Drawing Sheets

(58) Field of Classification Search
CPC ........ H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/07; H02M 3/073; H02M 2003/071; H02M 2003/072; H02M 2003/075; H02M 2003/076; H02M 2003/077; H02M 2003/078; H02M 2001/0048; H05B 39/048; B23K 11/24; H04B 2215/069; H02J 3/46; H02J 3/38; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/16585; G01R 19/1658; G01R 19/16595; G01R 19/17

See application file for complete search history.

(56) References Cited

U.S. PATENT DOCUMENTS

| | | | |
|---|---|---|---|
| 7,417,488 B2* | 8/2008 | Ahmed | H02M 3/157 327/541 |
| 8,036,762 B1 | 10/2011 | Young et al. | |
| 9,345,083 B2 | 5/2016 | Hussain et al. | |
| 10,715,039 B1* | 7/2020 | Ilango | G01R 19/175 |
| 10,845,833 B1 | 11/2020 | Dietrich et al. | |
| 12,113,439 B2* | 10/2024 | Wu | G05F 1/465 |
| 2005/0001603 A1* | 1/2005 | May | H02M 3/1588 323/284 |
| 2007/0257647 A1* | 11/2007 | Chen | H02M 3/157 323/282 |
| 2009/0079408 A1* | 3/2009 | Qiao | H02M 3/1588 323/283 |
| 2009/0160422 A1* | 6/2009 | Isobe | H02M 3/156 323/318 |
| 2010/0148741 A1* | 6/2010 | Chen | H02M 3/158 323/285 |
| 2012/0200271 A1* | 8/2012 | Henzler | H02M 3/156 323/235 |
| 2013/0294118 A1* | 11/2013 | So | H02M 3/33507 363/21.16 |
| 2014/0253061 A1* | 9/2014 | Yang | H02M 3/158 323/271 |
| 2014/0354257 A1* | 12/2014 | Paul | H02M 1/44 323/284 |
| 2020/0083809 A1* | 3/2020 | de Marco | H02M 3/158 |

* cited by examiner

METHOD AND APPARATUS FOR REDUCING AUDIBLE BUZZ FROM A SWITCHING-MODE POWER SUPPLY

TECHNICAL FIELD

The present description relates generally to electronic circuits, including, for example, a method and apparatus for reducing audible buzz from a switching-mode power supply.

BACKGROUND

A switching-mode power supply (SMPS) switches on a power stage to charge an inductor during a duty cycle time set by a pulse-width modulator. The stored energy in the inductor will then be transferred to output by switching off the power stage during the rest of this switching cycle. This kind of switching behavior makes SMPS's startup current a triangular shape instead of a direct current (DC) as in the linear regulators, which suggests that the SMPS's input current would have a high crest factor.

An SMPS can operate either in active mode, or standby mode. The active mode is for normal operation, where the SMPS supports the load, while maintaining output voltage regulation under all kinds of disturbances. The load current level in active mode can take any values between zero to full load. To achieve a higher efficiency at the light load, pulse frequency modulation (PFM) is usually adopted to skip pulses so switching loss can be reduced. Therefore, the PFM frequency can be lower than 20 kilohertz (KHz) and enters the audio band at the light load. This is undesirable, as it can degrade a signal-to-noise ratio (SNR) of the system and cause an audio noise issue at the output capacitors of the SMPS.

An existing technique uses a closed control loop to sense the PFM frequency, and regulate it to a set value with a current digital-to-analog converter (IDAC) as a dummy load. The drawbacks of this technique can be attributed to the complexity, large chip area, and limited speed of the used closed control-loop circuit.

BRIEF DESCRIPTION OF THE DRAWINGS

Certain features of the subject technology are set forth in the appended claims. However, for purposes of explanation, several aspects of the subject technology are depicted in the following figures:

DETAILED DESCRIPTION

The detailed description set forth below is intended as a description of various configurations of the subject technology and is not intended to represent the only configurations in which the subject technology may be practiced. The appended drawings are incorporated herein, and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

According to some aspects, the subject technology is directed to a method and apparatus for preventing audible buzz from a high-efficiency SMPS in an electronic device. In some embodiments, examples of the electronic device include, but are not limited to, a health module and a wearable device such as a smartwatch or any other similar electronic device. Examples of the health module include, but is not limited to, a glucose meter, an oximeter, a muscle stimulator and so on. In some embodiments, a regulator circuit of the subject technology includes a boost converter to switch a first current based on a switching frequency, and a first circuit coupled to the boost converter to reduce an audible noise, and improve an SNR of the boost converter by adjusting the switching frequency through modifying a PFM frequency of the boost converter. In some embodiments, switching a current implies periodically turning the first on and off, for example, using a switching frequency, such as 2.1 MHz. The first circuit is configured to modify the PFM frequency to adjust the switching frequency of the boost converter to a value higher than an audio-frequency threshold, as described herein. The techniques of the subject disclosure can immediately (e.g., in a nanosecond (ns) time scale) set the switching frequency to a target frequency (e.g., more than 20 KHz) based on the switching frequency of the boost converter.

In some embodiments, the subject technology maintains the output voltage regulation by using a dummy current (Idummy) as a control knob, so that the exact amount of the Idummy can be settled and applied. During the settling, the output voltage of the boost converter can have some ripple (e.g., fluctuating voltage), which can be taken care of by a low drop-out (LDO) circuit. In other words, with the subject implementation, the output voltage of the boost converter is regulated by setting a right current DAC code for the dummy current control, as described herein.

The technique of the subject technology has advantageous features compared to an existing closed-loop approach. The advantageous features include less complexity, smaller chip area, and higher speed.

Figure 1:
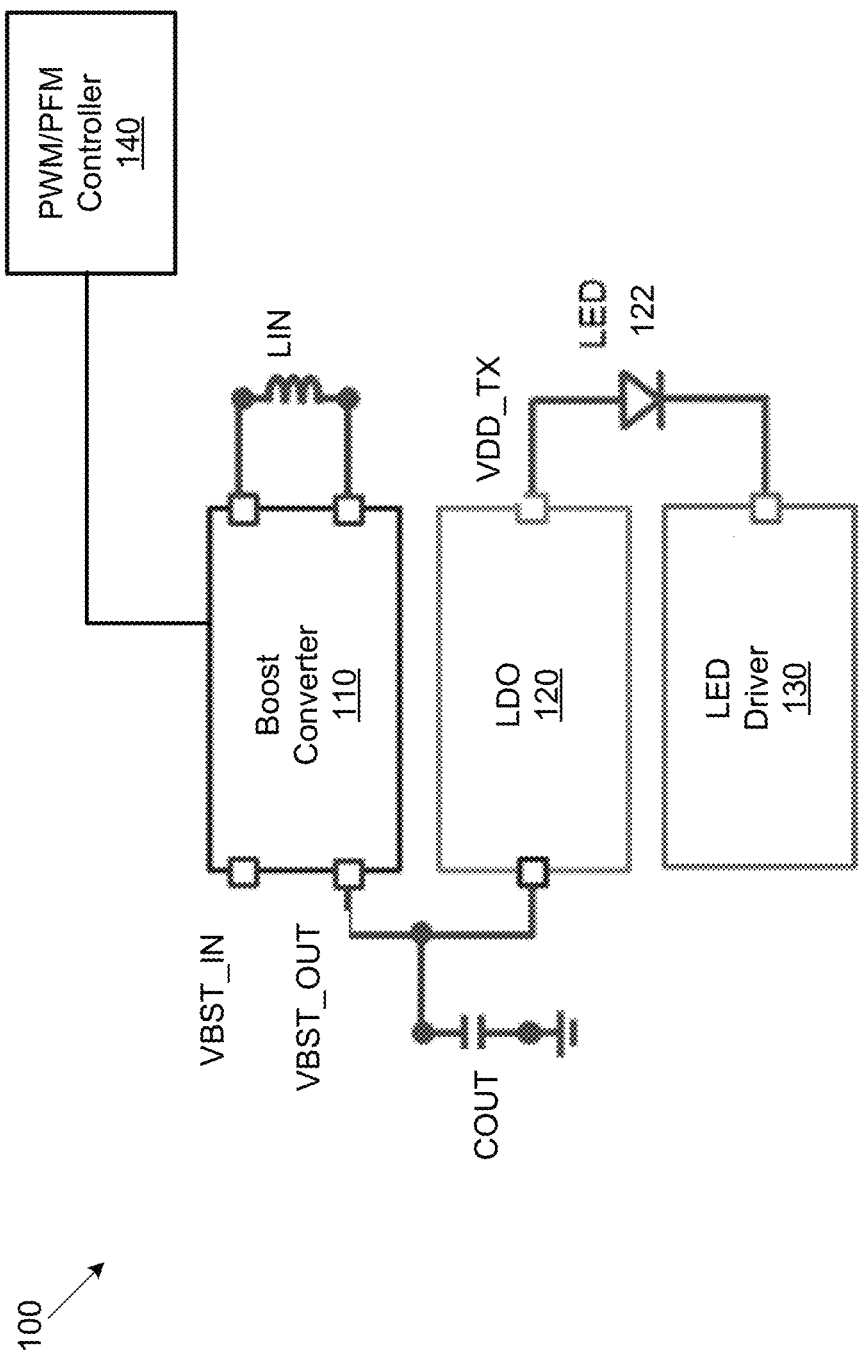
FIG. 1 illustrates a high-level diagram illustrating an example of a regulator circuit, within which some aspects of the subject technology are implemented.

FIG. 1 is a high-level diagram illustrating an example of a regulator circuit 100, within which, some aspects of the subject technology are implemented. The regulator circuit 100 is an SMPS that operates without audible noise, and includes, but is not limited to, a boost converter 110, an LDO circuit 120, an LED driver 130, and a control circuit 140, which in some embodiments, is a pulse-width modulation (PWM)/PFM controller. In some embodiments, the PWM is a modulation of a width of a pulse, for example, periodically changing the width of pulses according to a modulation frequency. In some embodiments, PFM is a modulation of a frequency of a pulse, for example, by skipping some pulse. In some embodiments, the boost converter 110 can provide an output voltage larger than a voltage of a power supply (e.g., battery) that can be provided in input voltage (VB-ST_IN) of the boost converter 110. The boost converter 110 includes switches that provide high frequency pulses (within a range of about tens of kHz to a few megahertz (MHz)) that can charge an inductor LIN, which can discharge to an output load of the regulator. To achieve a higher efficiency at low-load current levels, the PFM is usually adopted to skip pulses so switching loss can be reduced. The PFM frequency can be lower than 20 KHz and enters the audio band at a low current load. This is undesirable, as it can degrade an SNR of the boost converter 110 and cause an audio noise issue at the output capacitor (COUT) of the boost converter 110.

The LDO circuit 120 is a regulator that is used to smooth the output voltage (VBST_OUT) of the boost converter 110. The LED driver 130 is a circuit that provides a load current drawn by an LED 122. In some embodiments, the control circuit 140 is a control circuit or a processor that can control the switching behavior of the boost converter. The subject technology distinguishes over the existing closed-loop approach by using the control circuit 140 coupled to the boost converter 110 to modify a PFM frequency of the boost converter 110, as further discussed herein.

Figure 2:
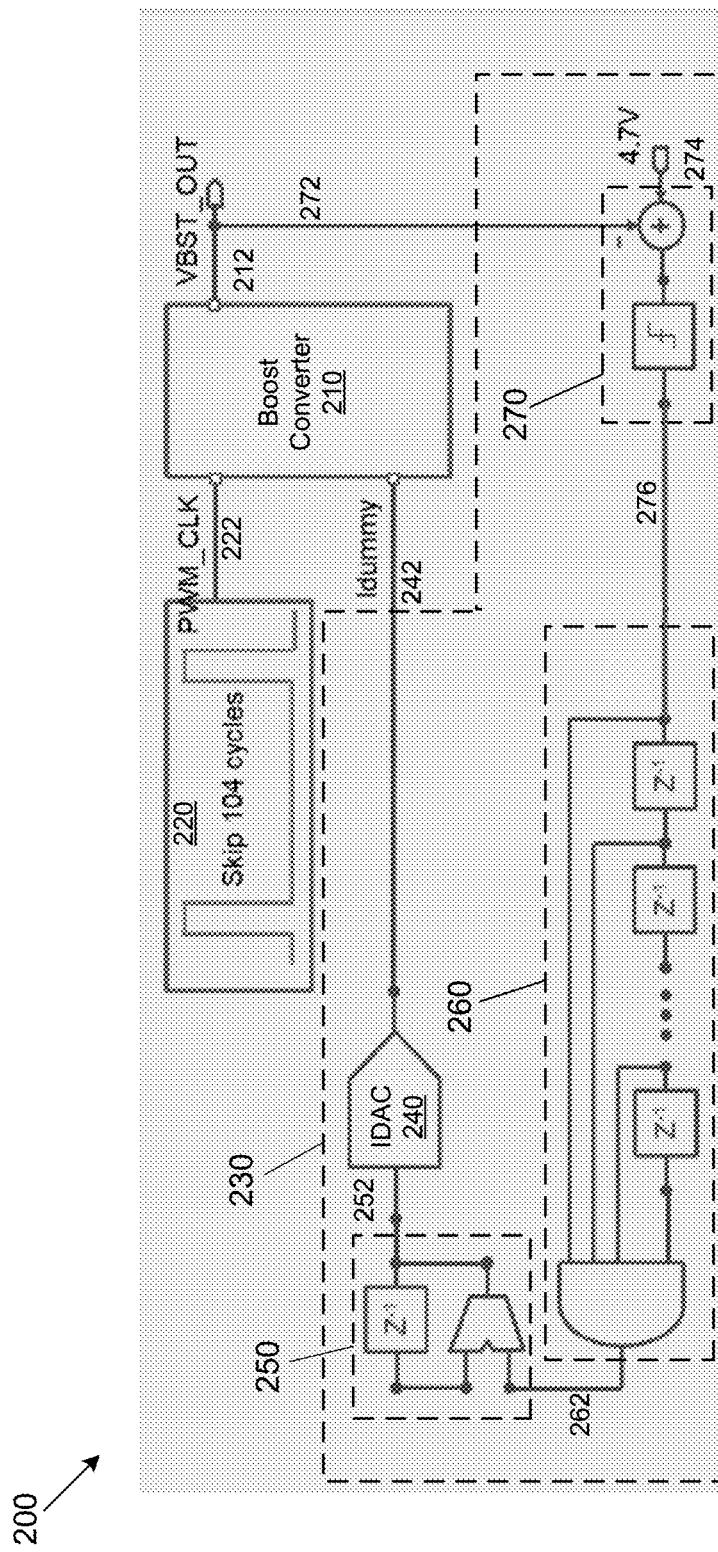
FIG. 2 illustrates a block diagram of an example of an integrated circuit for modifying a PFM switching frequency of a boost converter, according to aspects of the subject technology.

FIG. 2 is a block diagram of an example of an integrated circuit 200 for modifying a PFM switching frequency of a boost converter 210, according to aspects of the subject technology. In some embodiments, the integrated circuit 200 is a regulator circuit of an electronic device such as a wearable electronic device, for example, a smartwatch or a similar device that operates without generating undesired audible noise. In some embodiments, the regulator circuit includes a boost converter 210, a first circuit 220, and a second circuit 230. In some embodiments, the integrated circuit 200, when taking the form of a regulator circuit, reduces an audible noise, and improves an SNR of the boost converter 210 by modifying a PFM frequency of the boost converter 210 via selectively skipping switching pulses to adjust a switching frequency of the boost converter. In some embodiments, selectively skipping is performed by skipping in a controlled manner, for example, periodically. Beneficially, operating at frequencies above the threshold frequency facilitates achieving the reduced audible noise.

In some embodiments, the boost converter 210 is similar to the boost converter 110 of FIG. 1, and performs similar functionalities. In some embodiments, the boost converter 210 provides a pulsed output current to a load such as an LED (e.g., LED 122 of FIG. 1). In some embodiments, a pulsed current is current that is periodically switched on and off. In some embodiments, the boost converter 210 switches a first current based on a switching frequency. In some embodiments, the first current is a pulsed output current of the boost converter 210.

In some embodiments, the first circuit 220 is a control circuit (e.g., a processor), and is coupled to the boost converter 210. In some embodiments, the first circuit 220 reduces an audible noise of the boost converter (e.g., associated with the capacitor COUT of FIG. 1), and improves an SNR of the boost converter 210 by adjusting the switching frequency through modifying a PFM frequency of the boost converter 210. In some embodiments, the first circuit 220 keeps a switching frequency of the pulsed output current above a threshold frequency by modifying a PFM frequency of the boost converter 210. In some embodiments, the first circuit 220 modifies the PFM frequency by periodically skipping a plurality of switching pulses. In some embodiments, periodically skipping is skipping in a regulated fashion with equal intervals between the skipped switching pulses. In some embodiments, the first circuit 220 determines a count N of the plurality of switching pulses based on a PWM frequency of the boost converter 210, and the audio-frequency threshold (e.g., 20 KHz). In some embodiments, the first circuit 220 causes selective skipping of N switching pulses per each N+1 switching pulse of the plurality of switching pulses. In some embodiments, the count N of the skipped switching pulses can be determined based on the PWM frequency ($f_{PWM}$) of the boost converter 210, and the audio-frequency threshold ($f_{ATH}$) as follows:

$$N = f_{PWM}/f_{ATH} - 1 \qquad \text{Eq. (1)}$$

For example, if the PWM frequency ($f_{PWM}$) is 2.1 MHz and the audio-frequency threshold ($f_{ATH}$) is 20 KHz, the count N of the skipped switching pulses would be: N=2.1×1000 (KHz)/20 (KH)−1=104. That is to say, for each PWM switching pulse, 104 successive pulses are skipped and this process is repeated periodically to reduce the frequency from 2.1 MHz to 20 KHz. In some embodiments, the first circuit 220 adjusts the switching frequency in a time scale less than a millisecond (e.g., microsecond (usec) time scale).

In some embodiments, the second circuit 230 includes a DAC 240 (e.g., an IDAC) coupled to the boost converter 210, an accumulator circuit 250, a calculator circuit 260, and a comparator 270. In some embodiments, the second circuit 230 generates a second current (e.g., Idummy 242) to regulate an output voltage 272 (VBST_OUT) of the boost converter 210. In some embodiments, the DAC 240 generates the second current based on a digital code 252. In some embodiments, a digital code is a code formed of a number of 1's and 0's, such as 11001010111. In some embodiments, the accumulator circuit 250 generates the digital code 252 based on a logic value generated based on a comparison between the output voltage 272 of the boost converter 210, and a reference voltage 274 (e.g., 4.7 Volts (V)) in order to regulate the output voltage 272. This is because the first output 276 of the comparator 270 is eventually converted to the Idummy 242 that regulates the output voltage 272. In some embodiments, the accumulator circuit 250 is a digital circuit that generates the digital code 252 based on a logic value 262, which can be either +1 (logic 1) or −1 (logic 0). The +1 and −1 values, respectively, cause the accumulator circuit 250 to generate a first code and a second code. The first code causes the DAC 240 to adjust the Idummy 242 such that the output voltage 272 increases. The second code causes the DAC 240 to adjust the Idummy 242 such that the output voltage 272 decreases. In some embodiments, the calculator circuit 260 includes a digital circuit implementing Z-transform expressions, and an AND logic gate to generate the logic value 262 based on a first output 276 of the comparator 270. In some embodiments, the comparator 270 compares a voltage with a reference voltage 274 (e.g., within a range of 4.7 V to 5.6 V) and generates the first output 276. In some embodiments, the voltage is the output voltage 272 derived from an output port 212 of the boost converter 210.

Figure 3:
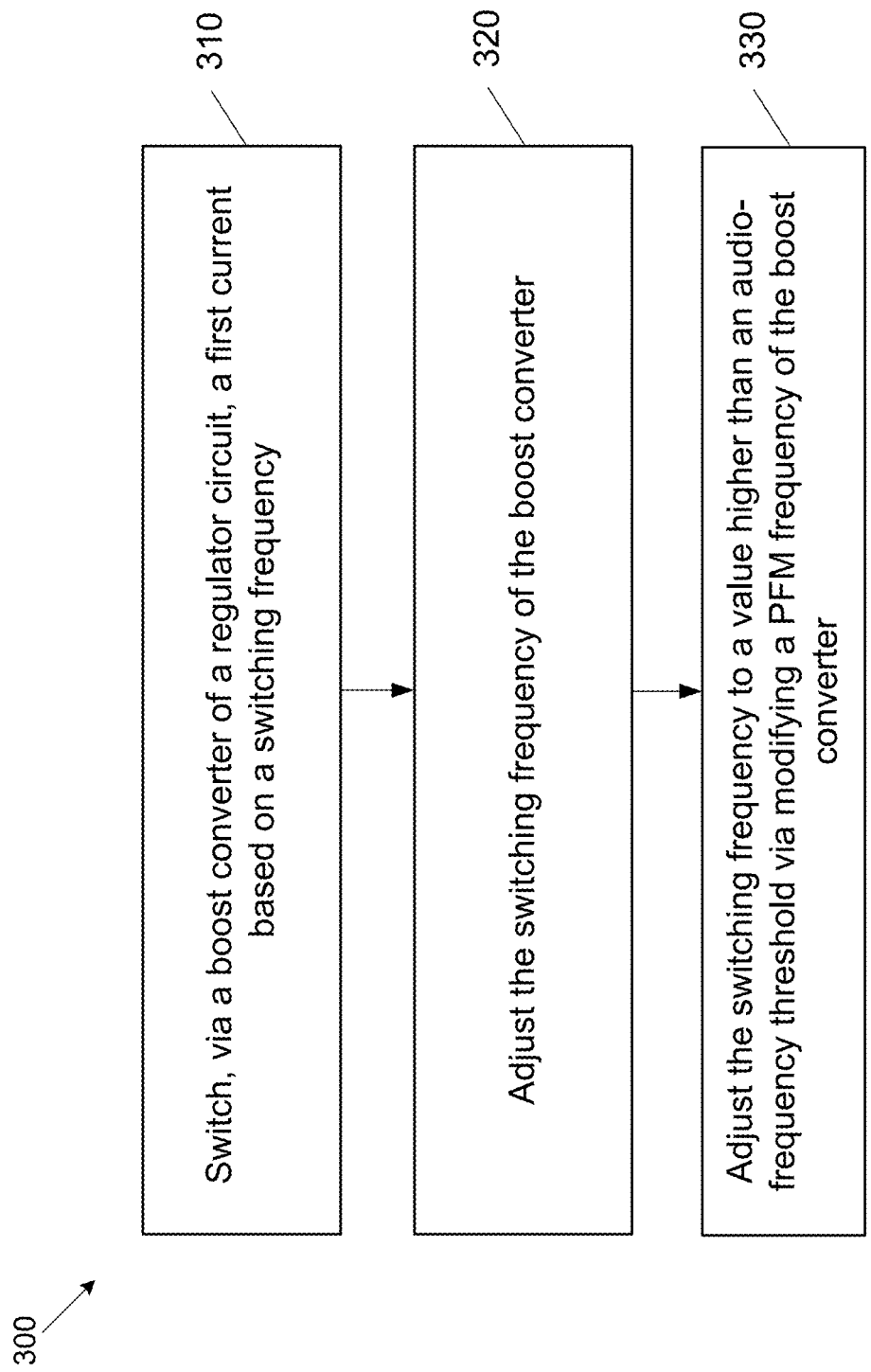
FIG. 3 illustrates a flow diagram illustrating an example of a process for modifying a PFM switching frequency of a boost converter, according to aspects of the subject technology.

FIG. 3 is a flow diagram illustrating an example of a process 300 for modifying a PFM switching frequency of a boost converter (e.g., boost converter 210 of FIG. 2), according to aspects of the subject technology. In some embodiments, the process 300 includes switching, via a boost converter, a first current (e.g., a load current provided to the LED 122 of FIG. 1) based on a switching frequency (e.g., a PWM switching frequency) (block 310). The process 300 also includes reducing an audible noise of the boost converter by adjusting (e.g., by the first circuit 220 of FIG. 2) the switching frequency of the boost converter (block 320). [Inventors: can you please provide values for X1, X2, and Y?] The process 300 further includes adjusting the switching frequency to a value higher than an audio-frequency threshold (e.g., 20 KHz) via modifying (e.g., by the first circuit 220 of FIG. 2) a PFM frequency of the boost converter (block 330). Adjusting the switching frequency can be achieved by adjusting the frequency of the PWM clock pulse 222 (PWM_CLK). In some embodiments, the first circuit 220 can skip a number of (e.g., 104) PWM pulses in order to adjust the switching frequency.

Figure 4:
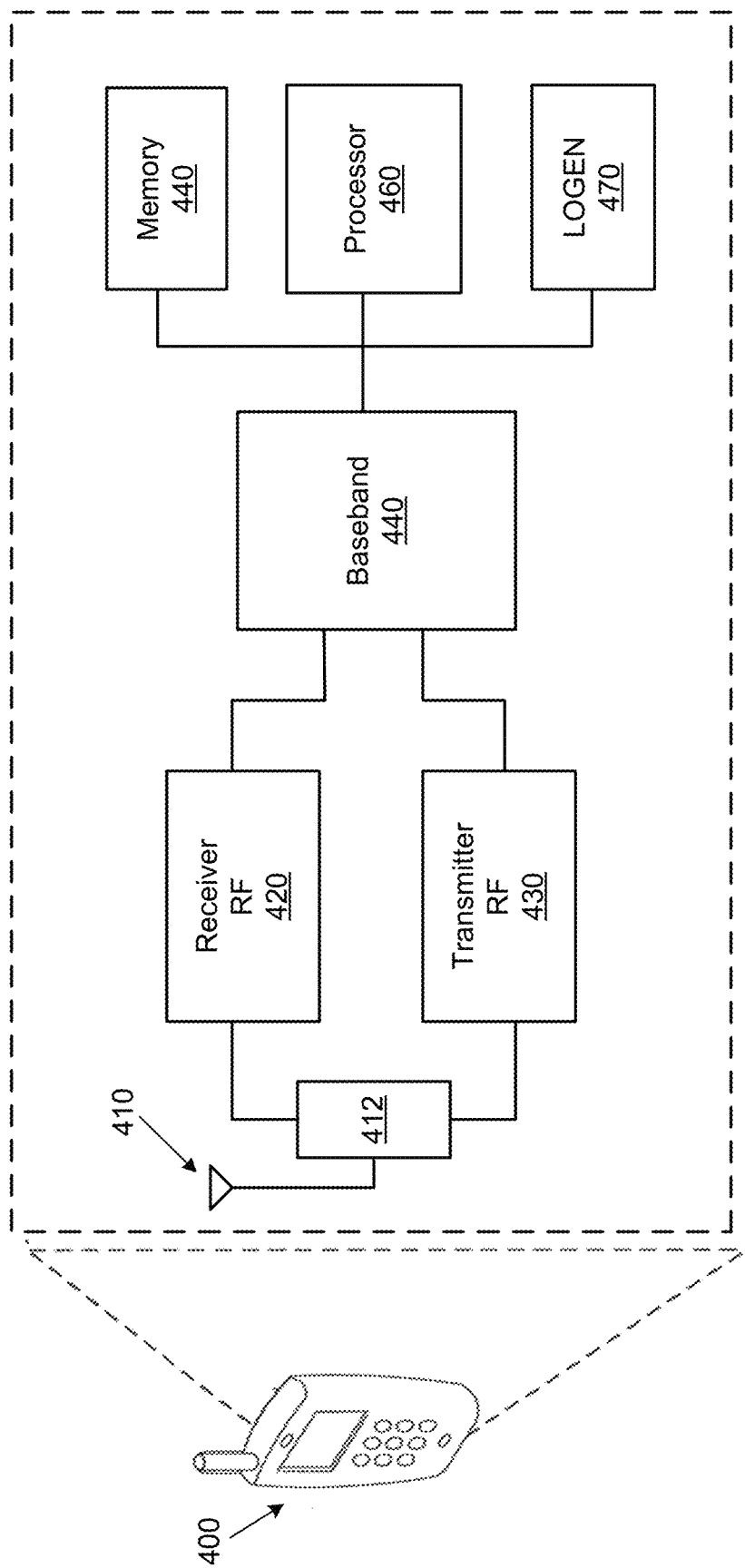
FIG. 4 illustrates an example of a wireless communication device, within which some aspects of the subject technology are implemented.

FIG. 4 illustrates an example of a wireless communication device 400, within which some aspects of the subject technology are implemented. In one or more implementations, the wireless communication device 400 can be a smartphone, a smartwatch, or other electronic apparatus, including one or more health-sense device(s). The wireless communication device 400 may comprise an RF antenna 410, a duplexer 412, a receiver 420, a transmitter 430, a baseband processing module 440, a memory 450, a processor 460, and a local oscillator generator (LOGEN) 470. In various aspects of the subject technology, one or more of the blocks represented in FIG. 4 may be integrated on one or more semiconductor substrates. For example, blocks 420-470 may be realized in a single chip, a single system on a chip, or in a multichip chipset.

The receiver 420 may comprise suitable logic circuitry and/or code that may be operable to receive and process signals from the RF antenna 410. The receiver 420 may, for example, be operable to amplify and/or down convert received wireless signals. In various aspects of the subject technology, the receiver 420 may be operable to cancel noise in received signals, and may be linear over a wide range of frequencies. In this manner, the receiver 420 may be suitable for receiving signals in accordance with a variety of wireless standards such as Wi-Fi, WiMAX, BT, and various cellular standards. In various aspects of the subject technology, the receiver 420 may not use any sawtooth acoustic wave filters, and a few, or no off-chip discrete components such as large capacitors, and inductors.

The transmitter 430 may comprise suitable logic circuitry and/or code that may be operable to process and transmit signals from the RF antenna 410. The transmitter 430 may, for example, be operable to upconvert baseband signals to RF signals and amplify RF signals. In various aspects of the subject technology, the transmitter 430 may be operable to upconvert and amplify baseband signals processed in accordance with a variety of wireless standards. Examples of such standards may include Wi-Fi, WiMAX, BT, and various cellular standards. In various aspects of the subject technology, the transmitter 430 may be operable to provide signals for further amplification by one or more power amplifiers.

The duplexer 412 may provide isolation in the transmit band to avoid saturation of the receiver 420 or damaging parts of the receiver 420, and to relax one or more design requirements of the receiver 420. Furthermore, the duplexer 412 may attenuate the noise in the receiver band. The duplexer 412 may be operable in multiple frequency bands of various wireless standards.

The baseband processing module 440 may comprise suitable logic, circuitry, interfaces, and/or code that may be operable to perform the processing of baseband signals. The baseband processing module 440 may, for example, analyze received signals, generate control, and/or feedback signals for configuring various components of the wireless communication device 400, such as the receiver 420. The baseband processing module 440 may be operable to encode, decode, transcode, modulate, demodulate, encrypt, decrypt, scramble, descramble, and/or otherwise process data in accordance with one or more wireless standards.

The processor 460 may comprise suitable logic, circuitry, and/or code that may enable processing data and/or controlling operations of the wireless communication device 400. In this regard, the processor 460 may be enabled to provide control signals to various other portions of the wireless communication device 400. The processor 460 may also control the transfer of data between various portions of the wireless communication device 400. Additionally, the processor 460 may enable implementation of an OS, or otherwise execute code to manage operations of the wireless communication device 400. In one or more implementations, the processor 460 may be interfaced with transducer modules via existing host interface technologies such as an inter-integrated circuit (I2C), a serial interface protocol (SPI), a peripheral component interconnect express (PCIE), a universal asynchronous receiver-transmitter (UART), and/or other interface technologies, depending on the data rate needed to sample, and pipe from the transducers module to the processor 460.

The memory 450 may comprise suitable logic, circuitry, and/or code that may enable storage of various types of information such as received data, generated data, code, and/or configuration information. The memory 450 may comprise, for example, RAM, ROM, flash, and/or magnetic storage. In various aspects of the subject technology, information stored in the memory 450 may be utilized for configuring the receiver 420, and/or the baseband processing module 440.

The LOGEN 470 may comprise suitable logic, circuitry, interfaces, and/or code that may be operable to generate one or more oscillating signals of one or more frequencies. The LOGEN 470 may be operable to generate digital and/or analog signals. In this manner, the LOGEN 470 may be operable to generate one or more clock signals, and/or sinusoidal signals. Characteristics of the oscillating signals, such as the frequency and duty cycle, may be determined based on one or more control signals from, for example, the processor 460 and/or the baseband processing module 440.

In operation, the processor 460 may configure the various components of the wireless communication device 400 based on a wireless standard, according to which, it is designed to receive signals. Wireless signals may be received via the RF antenna 410, amplified, and down converted by the receiver 420. The baseband processing module 440 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 400, data to be stored to the memory 450, and/or information affecting and/or enabling operation of the wireless communication device 400. The baseband processing module 440 may modulate, encode, and perform other processing on audio, video, and/or control signals to be transmitted by the transmitter 430 in accordance with various wireless standards.

In some implementations, all active components of the wireless communication device 400, for example, the receiver 420, the transmitter 430, the baseband processing module 440, the memory 450, the processor 460, and the LOGEN 470 may receive power from a power supply, including an SMPS including the integrated circuit 200 of FIG. 2 of the subject technology, and benefit from the audible-noise-free and reduced-SNR features of the disclosed technology.

The predicate words "configured to," "operable to," and "programmed to" do not imply any particular tangible or intangible modification of a subject, but rather, are intended to be used interchangeably. For example, a processor configured to monitor and control an operation, or a component may also mean the processor is being programmed to monitor and control the operation, or the processor being operable to monitor and control the operation. Likewise, a processor configured to execute code can be construed as a processor programmed to execute code, or operable to execute code.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

A phrase such as an "aspect" does not imply that such aspect is essential to the subject technology, or that such aspect applies to all configurations of the subject technology. A disclosure relating to an aspect may apply to all configurations, or one or more configurations. A phrase such as an "aspect" may refer to one or more aspects, and vice versa. A phrase such as a "configuration" does not imply that such configuration is essential to the subject technology, or that such configuration applies to all configurations of the subject technology. A disclosure relating to a configuration may apply to all configurations, or one or more configurations. A phrase such as a "configuration" may refer to one or more configurations, and vice versa.

The word "example" is used herein to mean "serving as an example or illustration." Any aspect or design described herein as an "example" is not necessarily to be construed as preferred or advantageous over other aspects or designs.

All structural and functional equivalents to the elements of the various aspects described throughout this disclosure that are known, or later come to be known to those of ordinary skill in the art, are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f) unless the element is expressly recited using the phrase, "means for" or, in the case of a method claim, the element is recited using the phrase, "step for." Furthermore, to the extent that the term "include," "have," or the like is used in the description or the claims, such term is intended to be inclusive in a manner similar to the term "comprise," as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above, generally in terms of their functionality. Whether such functionality is implemented as hardware or software depends upon the particular application, and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. An apparatus, comprising:
   a regulator circuit configured to switch a first current based on a switching frequency and generate an output voltage; and
   a first circuit coupled to a boost converter and configured to adjust the switching frequency by changing a pulse-frequency-modulation (PFM) frequency of a clock pulse of the regulator circuit to a value higher than a threshold;
   a second circuit configured to generate a second current based on a digital code, wherein the digital code is generated based on a logic value, wherein the second current is used as an input to the boost converter to regulate an output voltage of the boost converter;
   wherein the second circuit comprises a calculator circuit configured to generate the logic value based on an output of a comparator, an input of the comparator coupled to an output of the comparator, an input of the comparator coupled to an output of the boost converter; and
   an accumulator circuit coupled to the comparator and configured to generate the digital code based on the logic value.

2. The apparatus of claim 1, further comprising the second circuit configured to generate a second current to control the output voltage of the regulator circuit.

3. The apparatus of claim 2, wherein the second circuit comprises a digital-to-analog converter (DAC) configured to generate the second current based on the digital code.

4. The apparatus of claim 3, wherein the second circuit further comprises an accumulator circuit configured to generate the digital code based on the logic value.

5. The apparatus of claim 1, wherein the second circuit further comprises the comparator configured to:
   compare the output voltage with a reference voltage, and
   generate the output of the comparator based on the comparison.

6. The apparatus of claim 1, wherein the first current comprises a pulsed output current of the circuit.

7. The apparatus of claim 1, wherein the first circuit further comprises a control circuit configured to change the PFM frequency by skipping a plurality of switching pulses.

8. The apparatus of claim 7, wherein the control circuit is configured to determine a count N of the plurality of switching pulses based on the pulse-width modulation (PWM) frequency of the regulator circuit and the threshold.

9. The apparatus of claim 8, wherein the control circuit is configured to cause periodic skipping of N switching pulses per each N+1 switching pulses of the plurality of switching pulses.

10. The apparatus of claim 8, wherein the control circuit is configured to adjust the switching frequency in a time less than a millisecond.

11. An apparatus, comprising:
    a regulator circuit configured to provide a pulsed output current and comprising:
    a first circuit coupled to the regulator circuit and configured to maintain a switching frequency of the pulsed output current above a threshold frequency by changing a pulse-frequency-modulation (PFM) frequency of a clock pulse of the regulator circuit by skipping a plurality of switching pulses;

a second circuit configured to generate a second current, based on a digital code generated by an accumulator circuit to regulate an output voltage of the regulator circuit; and wherein the accumulator circuit is configured to generate the digital code based on a logic value that is generated based on a comparison between the output voltage of the regulator circuit and a reference voltage.

12. The apparatus of claim 11, wherein the first circuit includes a control circuit configured to determine a count N of the plurality of switching pulses based on the pulse-width modulation (PWM) frequency of the regulator circuit and the threshold frequency.

13. The apparatus of claim 12, wherein the control circuit is configured to cause periodic skipping of N switching pulses per each N+1 switching pulses of the plurality of switching pulses.

14. The apparatus of claim 11, wherein the regulator circuit further comprises the second circuit configured to generate a second current to regulate an output voltage of the regulator circuit.

15. The apparatus of claim 14, wherein the second circuit comprises a digital-to-analog converter (DAC) configured to generate the second current based on the digital code generated by the accumulator circuit.

16. A communication device, comprising:

a boost converter coupled to a first circuit and a second circuit, wherein:

the first circuit is configured to determine a count of a plurality of switching pulses based on a pulse-frequency-modulation (PFM) frequency of a clock pulse of the boost converter and change the PFM frequency via selectively skipping switching pulses, based at least on the count, to adjust a switching frequency of the boost converter, and the second circuit is configured to generate a second current to regulate an output voltage of the boost converter; and wherein the second circuit is configured to generate the second current based on a digital code and wherein the digital code is generated based on a logic value that is generated based on a comparison between the output voltage of the boost converter and a reference voltage.

17. The communication device of claim 16, wherein the first circuit comprises a control circuit configured to:

determine a count N of a plurality of switching pulses based on the pulse-width modulation (PWM) frequency of the boost converter and an audio-frequency threshold, and cause selective skipping of the switching pulses by selectively skipping N switching pulses per each N+1 switching pulses of the plurality of switching pulses.

18. The communication device of claim 16, wherein the second circuit comprises a digital-to-analog converter (DAC) configured to generate the second current based on the digital code generated by an accumulator circuit, and wherein the accumulator circuit is configured to generate the digital code based on the logic value that is generated based on the comparison between the output voltage of the boost converter and the reference voltage.

* * * * *